United States Patent [19]

Nakayama et al.

[11] Patent Number: 5,683,803

[45] Date of Patent: Nov. 4, 1997

[54] MAGNETO-OPTICAL RECORDING MEDIUM AND METHOD OF RECORDING AND REPRODUCING USING THE SAME

[75] Inventors: Junichiro Nakayama; Michinobu Mieda, both of Shiki-gun; Junji Hirokane; Akira Takahashi, both of Nara; Kenji Ohta, Kitakatsuragi-gun, all of Japan

[73] Assignee: Sharp Kabushiki Kaisha, Osaka, Japan

[21] Appl. No.: 433,088

[22] Filed: May 3, 1995

[30] Foreign Application Priority Data

May 24, 1994 [JP] Japan .................................. 6-109933

[51] Int. Cl.[6] .............................. G11B 5/66; B32B 5/16
[52] U.S. Cl. .................. 428/332; 428/336; 428/694 ML; 428/694 MT; 428/694 RE; 428/694 MM; 428/694 EC; 428/900; 369/13
[58] Field of Search ................... 369/13; 428/694 MT, 428/694 RE, 694 MM, 694 EC, 694 ML, 900, 332, 336

[56] References Cited

U.S. PATENT DOCUMENTS

| 5,204,193 | 4/1993 | Sato et al. ............................. 428/694 R |
| 5,265,073 | 11/1993 | Osato ......................................... 369/13 |
| 5,278,810 | 1/1994 | Takahashi et al. ........................ 369/13 |
| 5,420,833 | 5/1995 | Tanaka et al. ............................ 369/13 |
| 5,428,585 | 6/1995 | Hirokane et al. ......................... 369/13 |
| 5,428,586 | 6/1995 | Kobayashi et al. ....................... 369/13 |
| 5,452,272 | 9/1995 | Murakami et al. ....................... 369/13 |

FOREIGN PATENT DOCUMENTS

| 258978A2 | 3/1988 | European Pat. Off. |
| 5-22303 | 3/1993 | Japan. |

Primary Examiner—Leszek Kiliman
Attorney, Agent, or Firm—David G. Conlin; William J. Daley, Jr.; Kevin J. Fornier

[57] ABSTRACT

A magneto-optical recording medium includes a first magnetic layer and a second magnetic layer being laminated. When information is to be recorded on the first magnetic layer, first, a magnetization direction in the second magnetic layer is arranged in one direction with an application of an initialization magnetic field. Then, an intensity modulated light beam is projected while applying thereto a recording magnetic field so as to change the magnetization direction in the second magnetic layer. Thereafter, the magnetization direction in the second magnetic layer is copied to the first magnetic layer, thereby recording information. The first magnetic layer has a magnetization in an intermediate direction between a perpendicular direction and an in-plane direction at room temperature, while has a perpendicular magnetization at above a predetermined temperature. Therefore, a smaller exchange coupling force is exerted from the first magnetic layer to the second magnetic layer at room temperature, thereby enabling a rewriting information with a smaller initialization magnetic field compared with the conventional method, thereby achieving a reduction in size of the apparatus and power conservation.

10 Claims, 5 Drawing Sheets

MAGNETO-OPTICAL RECORDING MEDIUM AND METHOD OF RECORDING AND REPRODUCING USING THE SAME

FIELD OF THE INVENTION

The present invention relates to a magneto-optical recording medium such as a magneto-optical disk, a magneto-optical tape and a magneto-optical card, etc., and a method of recording and reproducing using such a magneto-optical recording medium.

BACKGROUND OF THE INVENTION

A conventional magneto-optical recording medium is composed of a magnetic thin film with perpendicular magnetization made of a magnetic substance formed on a substrate as a recording layer. Recording and reproducing operations on and from the recording medium are performed in the following manner.

When a recording operation is to be carried out, first, the magnetization direction in the recording layer is arranged in one direction (upward or downward) by applying thereto a strong external magnetic field, in order to initialize the recording medium. Then, a laser beam is projected onto a recording area of the recording medium so as to raise the temperature thereof above a vicinity of its Curie temperature or above a vicinity of its compensation temperature. As a result, a coercive force Hc at the portion becomes zero or nearly zero. In this state, an external magnetic field (recording magnetic field) having an opposite direction to an initialization magnetic field is applied to the recording layer, thereby reversing the magnetization direction. After the projection of the laser beam is stopped, the temperature of the recording medium drops to room temperature, and the reversed magnetization direction is fixed, thereby recording information thermomagnetically.

When a reproducing operation is to be carried out, a linearly polarized laser beam is projected onto the recording layer, and the recorded information is optically read out utilizing an effect that the polarization plane of reflected or transmitted light rotates differently according to the magnetization direction (magnetic Kerr effect, magnetic Faraday effect).

The magneto-optical recording medium designed for the above-mentioned recording and reproducing method has been viewed with interest as a rewritable high density and large capacity memory device. However, in order to rewrite information, especially, when erasing recorded information, it is required to arrange the magnetization direction in the recording layer in one direction with an application of the strong magnetic field as in the case of initialization. For this purpose, an external magnetic field generation device is required in the apparatus, thereby presenting the problem of increasing the size of the apparatus, and a longer time required for rewriting, etc.

In order to counteract the described problem, for example, Jpn. Jour. Appl. Phys., Vol. 28(1989) Suppl.28-3, pp.367–370 discloses an overwritable recording medium whereon information recorded on a recording layer can be rewritten with an application of a smaller external magnetic field by adopting an exchange coupling double layer film as a recording layer.

The structure of the recording medium and the overwriting process of the above-noted document will be briefly explained below.

Figure 7:
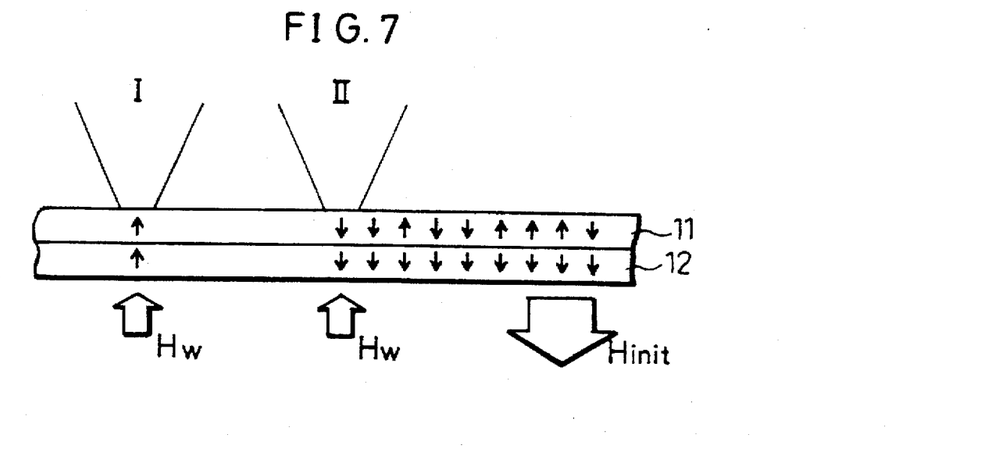
FIG. 7 is an explanatory view showing a process for recording on a conventional magneto-optical disk.
Figure 8:
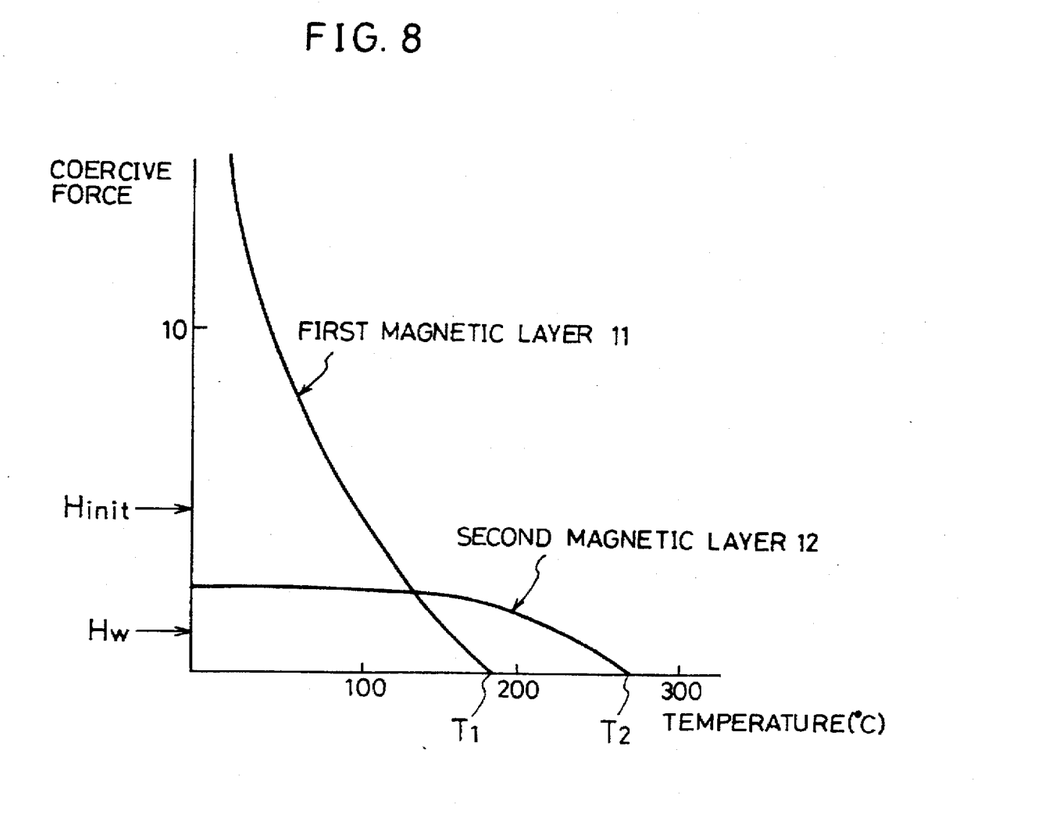
FIG. 8 is a graph showing a temperature dependency of a coercive force of each magnetic layer in the magneto-optical disk of FIG. 7.

As illustrated in FIG. 7, the recording layer is composed of a first magnetic layer 11 and a second magnetic layer 12 which are laminated. Both the first magnetic layer 11 and the second magnetic layer 12 show perpendicular magnetic anisotropy. As illustrated in FIG. 8, the recording layer has the following characteristic: The coercive force of the first magnetic layer 11 at room temperature is large, while the coercive force of the second magnetic layer 12 at room temperature is small. The Curie temperature $T_2$ of the second magnetic layer 12 is higher than the Curie temperature $T_1$ of the first magnetic layer 11.

As illustrated in FIG. 7, the rewriting of information on the recording layer having the described arrangement is performed in the following manner. First, an initialization magnetic field ($H_{init}$) is applied to the recording layer so as to arrange only the magnetization direction in the second magnetic layer 12 in one direction (downward in the figure). In this state, as illustrated in FIG. 8, an initialization magnetic field has a still lower intensity according to the coercive force of the second magnetic layer 12 at room temperature.

Thereafter, as illustrated in FIG. 7, while applying a recording magnetic field ($H_w$) having an opposite direction to the initialization magnetic field to the recording layer, a laser beam whose intensity is modulated to the high level I and the low level II is projected. When the laser beam of the high level I is projected, the temperature of the irradiated portion is raised to or above a vicinity of the Curie temperature $T_2$ of the second magnetic layer 12. As a result, the magnetization direction in the second magnetic layer 12 is reversed in an upward direction by the recording magnetic field ($H_w$). Thereafter, in the process of cooling off, the magnetization direction in the second magnetic layer 12 is copied to the first magnetic layer 11 by the exchange coupling force exerted on an interface. As a result, the magnetization direction in the first magnetic layer 11 also shows the upward direction.

On the other hand, when a laser beam of the low level II is projected, the temperature of the irradiated portion is raised only to the vicinity of the Curie temperature $T_1$ of the first magnetic layer 11. In this state, as illustrated in FIG. 8, since the coercive force of the second magnetic layer 12 is larger than the recording magnetic field ($H_w$), the magnetization direction in the irradiated portion will not be reversed by the recording magnetic field ($H_w$), thereby maintaining the magnetization direction in the initialized state. In the process of cooling off to room temperature from this state, the magnetization direction in the first magnetic layer 11 is arranged in the magnetization direction in the second magnetic layer 12 by the exchange coupling force exerted on the interface. Therefore, the magnetization direction in the first magnetic layer 11 shows a downward direction.

The information recorded on the first magnetic layer 11 is reproduced by projecting a laser beam having a still lower intensity than the low level II used in recording.

As described, the exchange coupling double layer film having the described arrangement permits the initialization of the second magnetic layer 12 using a still smaller initialization magnetic field. Moreover, after being initialized, information can be rewritten on the first magnetic layer 11 using a small recording magnetic field. This feature offers the effects of reducing the size of the apparatus, and a high speed overwriting operation.

However, in the described arrangement, the magnetic field $H_{init}$ required for initializing the second magnetic layer 12 is determined not only by the coercive force of the second magnetic layer 12 at room temperature but also by the exchange coupling force exerted from the first magnetic layer 11 which is in fact an important factor. Then, as a large exchange coupling force is exerted, it is required to set the intensity of the initialization magnetic field $H_{init}$ higher according to the exchanged coupled force. As a result, a significant reduction in the size of the apparatus or in power conservation cannot be achieved.

Another magneto-optical recording medium is disclosed, for example, by Japanese Examined Patent Publication No. 22303/1993 (Tokukohei 5-22303), wherein an intermediate layer which shows an in-plane magnetic anisotropy at room temperature is formed between the first magnetic layer and the second magnetic layer. This feature permits a use of a smaller initialization magnetic field $H_{init}$. However, in the described arrangement, a magnetic layer of triple layer structure is employed, thereby presenting the problem that complicated processes may be required.

SUMMARY OF THE INVENTION

An object of the present invention is to provide a magneto-optical recording medium having an exchange-coupled double layer structure, which permits a higher recording density, and a reduction in size and a power conservation of a recording and reproducing apparatus employing the magneto-optical recording medium, and also to provide a magneto-optical recording method and a method of reproducing magneto-optically recorded information designed for such magneto-optical recording medium.

In order to achieve the above object, a magneto-optical recording medium in accordance with the present invention is characterized by comprising a first magnetic layer and a second magnetic layer being laminated, wherein the second magnetic layer has a perpendicular magnetization in a range between room temperature and its Curie temperature, after arranging a magnetization direction of the second magnetic layer in one direction with an application of an initialization magnetic field at room temperature, the temperature of the second magnetic layer is partially raised by projecting thereto an intensity modulated light beam while applying thereto a recording magnetic field so as to change the magnetization direction in the second magnetic layer in response to an intensity of a light beam, thereafter, the magnetization direction in the second magnetic layer is copied to the first magnetic layer so as to record thereon information, information recorded on the first magnetic layer is reproduced by projecting thereto a reproducing light beam, and the first magnetic layer has a magnetization in an intermediate direction between a perpendicular direction and an in-plane direction at room temperature, and the perpendicular magnetization at above a predetermined temperature.

According to the above arrangement, the first magnetic layer does not have a complete perpendicular direction at room temperature and has a magnetization in an intermediate direction between the perpendicular direction and the in-plane direction. Therefore, compared with the conventional arrangement where the first magnetic layer has a complete perpendicular magnetization at room temperature, a smaller exchange coupling force is exerted from the first magnetic layer to the second magnetic layer at room temperature. This feature offers the effect that in rewriting information, the magnetization direction in the second magnetic layer can be arranged with an application of a smaller initialization magnetic field. Since this permits a reduction in size of the initialization magnetic field generating device, a reduction in size of the entire apparatus and a power conservation can be achieved.

According to the described arrangement, when reproducing information, by setting the power of the reproducing light beam sufficient for raising the temperature of the irradiated portion above a predetermined temperature at which a perpendicular magnetization is shown in the irradiated portion, the first magnetic layer has a magnetization in a completely perpendicular direction. As a result, information can be reproduced based on the magnetization direction as in the conventional case.

A magneto-optical recording method in accordance with the present invention is designed for a magneto-optical recording medium including a first magnetic layer which has a magnetization in an intermediate direction between a perpendicular direction and an in-plane direction at room temperature, and a perpendicular magnetization at above a predetermined temperature and a second magnetic layer wherein the first magnetic layer and the second magnetic layer are laminated. The method is characterized by including the steps of:

initializing the magneto-optical recording medium with an application of an initialization magnetic field which is smaller than a saturation magnetic field of the first magnetic layer in which a perpendicular component of the magnetization at room temperature is saturated, and is larger than a coercive force of the second magnetic layer;

changing a magnetization direction in the second magnetic layer by partially raising a temperature of the second magnetic layer by projecting an intensity modulated light beam on the magneto-optical recording medium while applying thereto a recording magnetic field; and copying the magnetization direction in the second magnetic layer to the first magnetic layer in a process of cooling off to room temperature.

According to the described arrangement, the magneto-optical recording medium is initialized by applying thereto an initialization magnetic field which is smaller than the saturation magnetic field of the first magnetic layer and is larger than the coercive force of the second magnetic layer, thereby permitting an overwriting by the light intensity modulation.

In this case, even if the coercive force of the first magnetic layer at room temperature is smaller than the coercive force of the second magnetic layer at room temperature, the magnetization direction in the first magnetic layer will not be reversed with an application of the initialization magnetic field larger than the coercive force of the second magnetic layer at room temperature as long as the initialization magnetic field is smaller than the saturation magnetic field. As a result, only the magnetization direction in the second magnetic field is arranged in the direction of the initialization magnetic field, thereby permitting the same initialization as that achieved by the conventional method.

Namely, as the first magnetic layer enables a still smaller coercive force at room temperature, an exchange coupling force exerted from the first magnetic layer to the second magnetic layer at room temperature can be made still smaller. As a result, as the initialization magnetic field can be made smaller, a reduction in the size of the apparatus and a power conservation can be achieved.

A reproducing method of a magneto-optically recorded information is designed for the magneto-optical recording medium including a first magnetic layer which has a magnetization in an intermediate direction between a perpendicular direction and an in-plane direction at room temperature, and a perpendicular magnetization at above a predetermined temperature, and a second magnetic layer being laminated. The reproducing method is characterized by including the step of projecting a reproducing light beam having a sufficient intensity for enabling a portion having a temperature rise above the predetermined temperature in the first magnetic layer to be a central portion having a smaller diameter than a diameter of a spot of the reproducing light beam.

According to the described arrangement, the intensity of the reproducing light beam is set such that when the reproducing light beam is projected, a portion in the first magnetic layer, having a temperature rise above a predetermined temperature is a central portion of the light spot of the reproducing light beam, which is smaller than the light spot diameter. Namely, in the reproducing operation, when the reproducing light beam is projected on the first magnetic layer, the temperature distribution of the irradiated portion becomes like a Gaussian distribution. In this state, a transition occurs to the perpendicular magnetization only in the central portion having a smaller diameter than the diameter of the reproducing light beam in the first magnetic layer, and thus the polar Kerr effect is shown only in the portion. Therefore, information is reproduced based on light reflected from the portion, and as the peripheral portion having low temperature does not have a perpendicular magnetization, the polar Kerr effect is not shown. As a result, reproduction of a recording bit with a size smaller than a light spot diameter of the light beam is permitted, thereby achieving an improved recording density.

For a fuller understanding of the nature and advantages of the invention, reference should be made to the ensuing detailed description taken in conjunction with the accompanying drawings.

DESCRIPTION OF THE EMBODIMENTS

The following descriptions will discuss one embodiment of the present invention in reference to FIG. 1 through FIG. 6.

Figure 2:
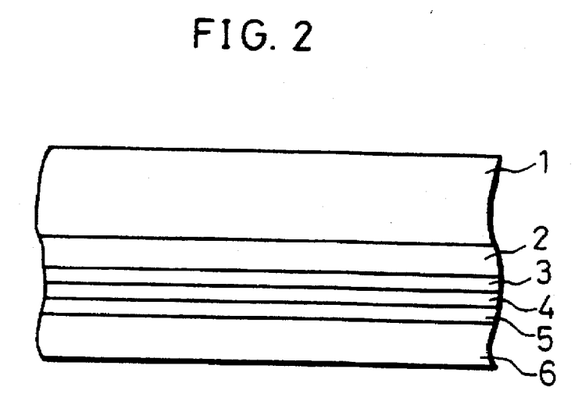
FIG. 2 is a typical depiction of a cross section showing a schematic structure of the magneto-optical disk.

As illustrated in FIG. 2, a magneto-optical disk as a magneto-optical recording medium of the present embodiment includes a light transmissive substrate 1 whereon a dielectric layer 2, a first magnetic layer 3, a second magnetic layer 4, a protective layer 5 and an overcoat film 6 are laminated in this order.

The substrate 1 is, for example, made of a disc-shaped glass plate with an outer diameter of 86 mm, an inter diameter of 15 mm and a thickness of .1.2 mm. On one surface of the substrate 1 (lower surface in the figure), a concave-convex guide track for use in guiding a light beam is formed by the reactive ion etching method, with a track pitch of 1.6 μm, a groove (concave) width of 0.8 μm, and a land (convex) width of 0.8 μm.

On the surface whereon the guide track is formed of the substrate 1, the dielectric film 2 made of AlN with a thickness of 80 nm is formed by the reactive sputtering method. The dielectric film 2 has a light transmissive property.

The first magnetic layer 3 formed on the dielectric layer 2 is made of GdFeCo (rare earth-transition metal alloy). The first magnetic layer 3 with a thickness of 50 nm is formed by simultaneously sputtering Gd, Fe and Co targets.

Figure 1:
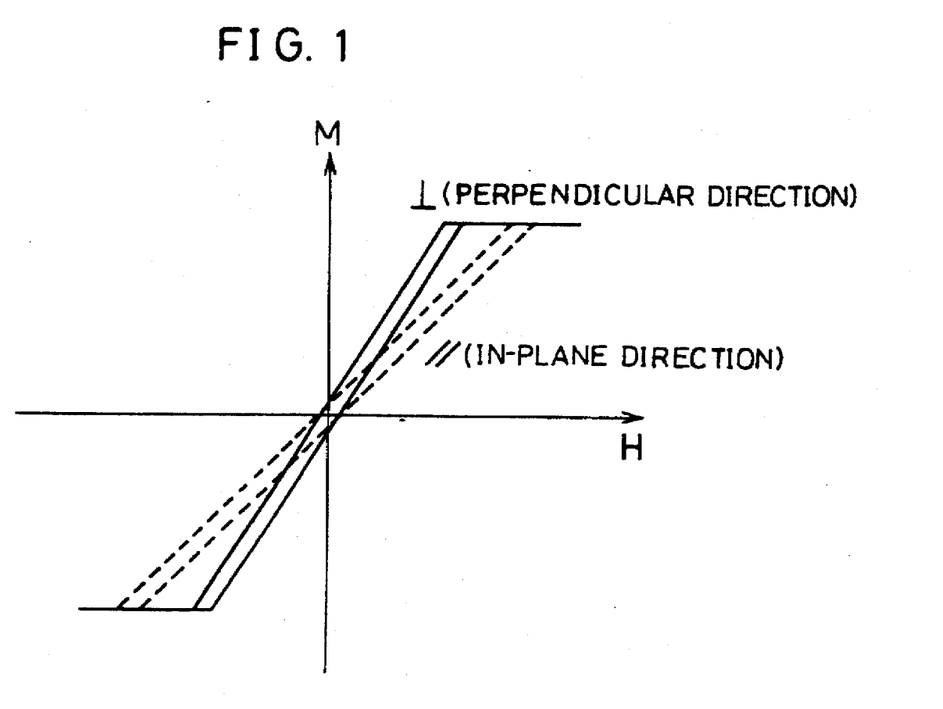
FIG. 1 is a graph showing respective external field dependencies of a perpendicular magnetization component and an in-plane magnetization component of the first magnetic layer formed in a magneto-optical disk in accordance with one embodiment of the present invention.
Figure 3:
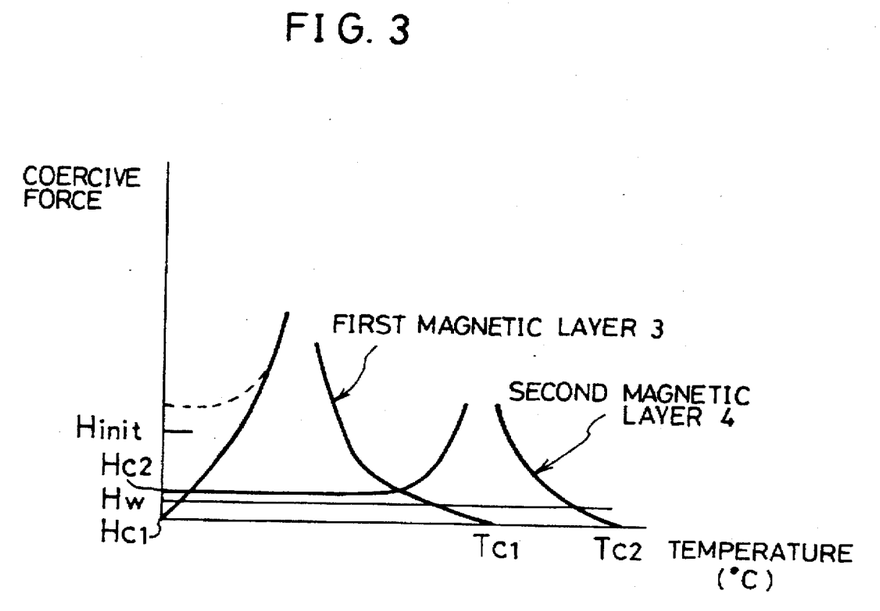
FIG. 3 is a graph showing temperature dependencies of respective coercive force of the first and second magnetic layers in the magneto-optical disk.
Figure 4:
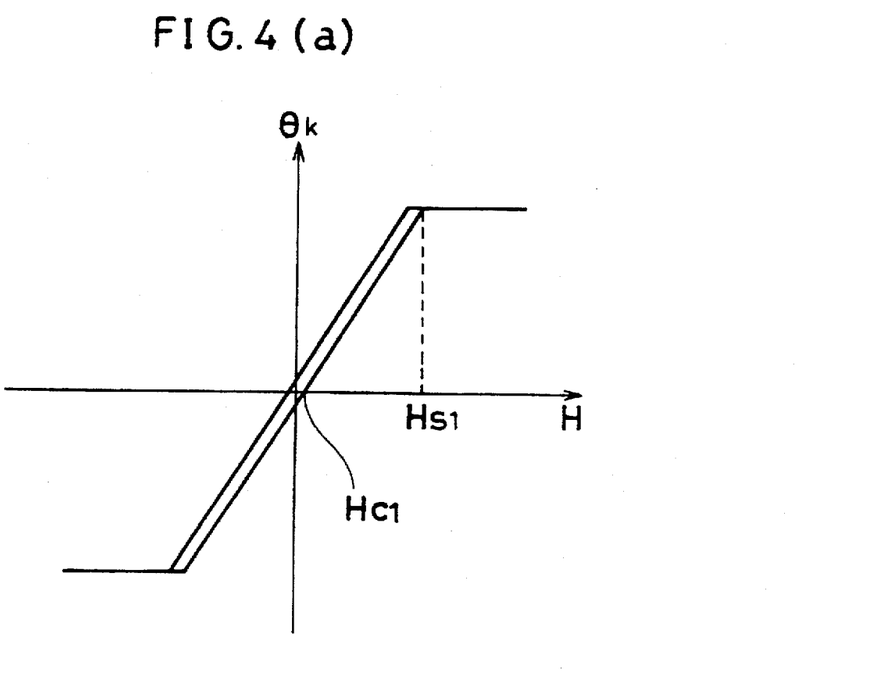
FIG. 4(a) is a graph showing an external magnetic field dependency of a Kerr rotation angle of the first magnetic layer at room temperature in the magneto-optical disk.
FIG. 4(b) is a graph showing an external magnetic field dependency of a Kerr rotation angle of the second magnetic layer at room temperature in the magneto-optical disk.

The first magnetic layer 3 is made of a rare-earth metal rich composition. As illustrated in FIG. 3, a perpendicular component ($Hc_1$) of the coercive force of the first magnetic layer 3 at room temperature is nearly zero. The Curie temperature ($Tc_1$) of the first magnetic layer 3 is 230° C., and the compensation temperature ($T_{COMP^1}$) of the first magnetic layer 3 is 150° C. FIG. 1 shows respective external magnetic field dependencies of the perpendicular magnetization and the in-plane magnetization in the first magnetic layer 3 at room temperature. The first magnetic layer 3 does not have the perpendicular magnetization at room temperature but has a characteristic that the perpendicular magnetization is slightly predominant over the in-plane magnetization, and at temperature above a vicinity of 80° C., the first magnetic layer 3 has the magnetization in a completely perpendicular direction. In FIG. 3, the short dashed line indicates a saturation magnetic field of the first magnetic layer 3, wherein a perpendicular component of the magnetization is saturated. From a certain temperature, the short-dashed line becomes identical with the solid line showing the coercive force. This indicates that at temperature above a certain temperature, a transition occurs in the first magnetic layer 3 to the perpendicular magnetization. As a result, the saturation magnetic field wherein a perpendicular component of the magnetization is saturated becomes identical with the coercive force.

The second magnetic layer 4 formed on the first magnetic layer 3 is made of GdDyFeCo (rare earth metal-transition metal alloy). The second magnetic layer 4 with a thickness of 50 nm is formed by the simultaneous sputtering of Gd, Dy, Fe and Co targets. The second magnetic layer 4 is also made of a rare-earth metal rich composition. As illustrated in FIG. 3, the coercive force ($Hc_2$) of the second magnetic layer 4 at room temperature, for example, 0.8 k Oe is larger than the coercive force ($Hc_1$) of the first magnetic layer 3 at room temperature. The Curie temperature ($Tc_2$) of the second magnetic layer 4 is 250° C., and the compensation temperature ($T_{comp^2}$) of the second magnetic layer 4 is 210° C. The second magnetic layer 4 has the perpendicular magnetization in a temperature range between room temperature and Curie temperature ($Tc_2$).

FIG. 4(a) and FIG. 4(b) respectively show external magnetic field dependencies of the Kerr rotation angle at room temperature of the first magnetic layer 3 and the second magnetic layer 4. The coercive force (Hc$_2$) of the second magnetic layer 4 at room temperature shown in FIG. 4(b) is smaller than the saturation magnetic field (Hs$_1$) of the first magnetic layer 3 shown in FIG. 4(a) wherein the perpendicular component of the magnetization is saturated.

Further, the protective layer 5 made of AlN with a thickness of 80 nm is formed so as to cover the first and second magnetic layers 3 and 4. The protective layer 5 is coated with an acrylate series ultraviolet ray hardening resin and is hardened by projecting thereto an ultraviolet ray so as to form the overcoat film 6, thereby manufacturing the magneto-optical disk of the present embodiment.

The sputtering conditions in forming the first and second magmnetic layers 3 and 4 are as follows:

ultimate vacuum: 2.0×10$^{-4}$ Pa or below

Ar gas pressure: 6.5×10$^{-1}$ Pa discharge power: 300 W

The sputtering conditions in forming the dielectric layer 2 and the protective layer 5 are as follows:

ultimate vacuum: 2.0×10$^{-4}$ Pa or below

N$_2$ gas pressure: 3.0×10$^{-1}$ Pa discharge power: 800 W

Figure 5:
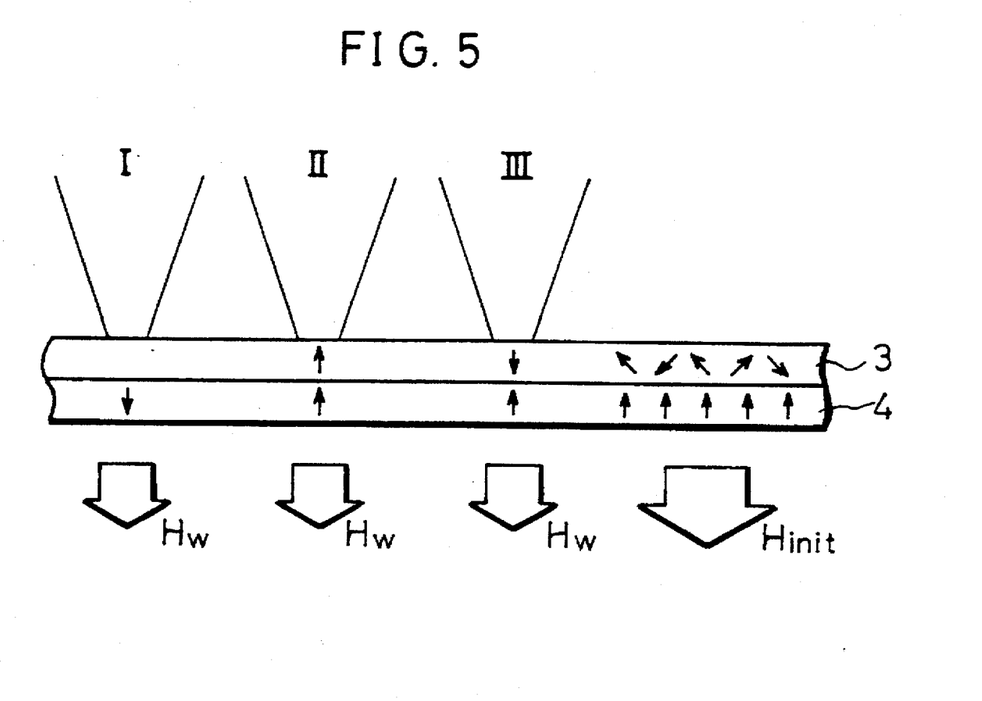
FIG. 5 is an explanatory view showing a recording process in the magneto-optical disk.

When information is to be recorded on the magneto-optical disk having the described arrangement, as shown in FIG. 5, the initialization magnetic field H$_{init}$ having a downward direction in the figure is applied so as to initialize. The initialization magnetic field H$_{init}$ is set to a value between the coercive force Hc$_2$ of the second magnetic layer 4 at room temperature and the saturated magnetic field H$_s{}^1$ of the first magnetic layer 3, for example, H$_{init}$=1.0 k Oe. Therefore, by the initialization, only the magnetization in the second magnetic layer 4 is arranged in one direction (upward in the figure) in the direction of the initialization magnetic field H$_{init}$. As described, the second magnetic layer 4 has such a characteristic that the sub-lattice magnetization of the rare-earth metal is greater than the sub-lattice magnetization of the transition metal, i.e., a so called rare-earth rich composition. Therefore, the arrow in the figure which shows the direction of the sub-lattice magnetization of the transition metal in the second magnetic layer 4 is arranged in an opposite direction to the direction of the initialization magnetic field H$_{init}$.

In this state, as the first magnetic layer 3 does not have a perpendicular magnetization at room temperature, the magnetization in the second magnetic layer 4 will not be copied to the first magnetic layer 3. Moreover, as the initialization magnetic field H$_{init}$ is smaller than the saturation magnetic field Hs$_1$ of the first magnetic layer 3, the magnetization in the first magnetic layer 3 will not be reversed. In the arrangement where the initialization magnetic field H$_{init}$ is applied by a permanent magnet integrated into the recording and reproducing apparatus, the initialization is always performed while rotating the magneto-optical disk. On the other hand, in the case of adopting the device for applying an initialization magnetic field H$_{init}$, for example, using an electro-magnet, an initialization is performed only when recording.

Figure 6:
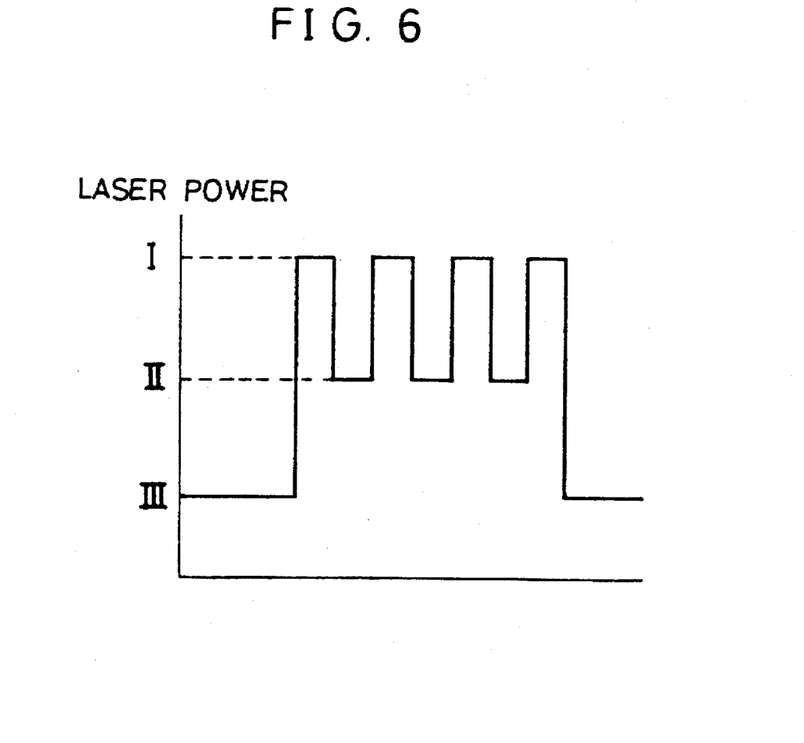
FIG. 6 is an explanatory view showing intensities of a laser beam to be projected on the magneto-optical disk.

After the initialization is performed, a recording of information is performed by projecting a laser beam whose intensity is to be modulated to the high level I and the low level II as shown in FIG. 6, while applying a magnetic field Hw (for example, 200 Oe) which is significantly smaller than the initialization magnetic field H$_{init}$ and has the same direction as the initialization magnetic field H$_{init}$.

The laser beam of the high level I is set to have a laser power required for raising the temperature of the irradiated portion above the Curie temperature T$_c{}^1$ of the first magnetic layer 3, further to the vicinity of the Curie temperature T$_c{}^2$ of the second magnetic layer 4 or above the first temperature (T$_H$). On the other hand, the laser beam of the low level II is set to have a laser power required for raising the temperature of the irradiated portion to the second temperature (T$_L$) in a vicinity of the Curie temperature T$_c{}^1$ of the first magnetic layer 3.

Therefore, when the laser beam of the high level I is projected, the magnetization direction in the irradiated portion of the second magnetic layer 4 having a temperature rise to the first temperature (T$_H$) is reversed into a downward direction by the recording magnetic field (H$_W$). Then, while the first magnetic layer 3 shows the perpendicular magnetization in the process of cooling off to the room temperature, the magnetization direction in the second magnetic layer 4 is copied to the first magnetic layer 3 so that the magnetization direction in the first magnetic layer 3 is arranged in the magnetization direction in the second magnetic layer 4 by the exchange coupling force exerted on the interface between the first and second magnetic layers 3 and 4. As a result, the magnetization in the first magnetic layer 3 is arranged in a downward direction.

In the case where the laser beam of the Low level II is projected, and the temperature of the irradiated portion is raised only to the second temperature (T$_L$), as the coercive force of the second magnetic layer 4 is greater than the recording magnetic field (H$_W$), the magnetization direction of the second magnetic layer 4 will not be reversed, and the magnetization direction in the initialized state is maintained. Then, in the process of cooling off, the magnetization direction in the second magnetic layer 4 is copied to the first magnetic layer 3 by the exchange coupling force exerted on the interface as in the described case. As a result, the magnetization direction of the first magnetic layer 3 arranged in the magnetization direction in the second magnetic layer 4 has an upward direction opposite to the aforementioned case.

After the magnetization direction in the second magnetic layer 4 is arranged in one direction with an application of the initialization magnetic field H$_{init}$ of, for example, around 1.0 k Oe, by projecting the laser beam whose intensity is modulated to the high level I and the low level II while applying thereto the recording magnetic field H$_W$ of around 200 Oe, new information can be written on the first magnetic layer 3 without being affected by the magnetization direction in the first magnetic layer 3 prior to projecting the laser beam, thereby permitting an overwriting operation. Additionally, the respective values of the high level I and the low level II can be exemplified as follows:

Laser power (P$_H$) of the high level I=10 mW

Laser power (P$_L$) of the low level II=4 mW.

Information is reproduced from the magneto-optical disk having the above arrangement by projecting a laser beam having a laser power of the reproducing level III that is still lower than the low level II as shown in FIG. 6 used in recording. The temperature of the portion irradiated with the laser beam is raised, and the magnetization in the portion shows a perpendicular direction. As a result, only the area subject to the transition to the perpendicular magnetization shows the polar Kerr effect. As a result, based on the light reflected from the portion, information is reproduced.

When a spot of the light beam is shifted so as to reproduce the next recording bit, the temperature of the previously reproduced portion drops, and the perpendicular magnetization is no longer shown. Accordingly, in the portion having a temperature drop, the polar Kerr effect is not shown. In this state, since the recorded information is masked, interference of signals from the adjoining bits can be prevented, thereby achieving an improved reproducing resolution.

In the present embodiment, the laser power of the reproducing level III is set in consideration of the fact that the temperature distribution in the irradiated portion becomes like a Gaussian distribution. Namely, the irradiated portion with the light beam does not have a uniform temperature even within the spot of the light beam, i.e., the central portion has the highest temperature, and the temperature is gradually lowered towards the circumference. Therefore, the laser power of the reproducing level III is set so as to have a high temperature portion and a low temperature portion within the spot of the light beam with a threshold temperature (around 80° C.) at which a transition occurs in the first magnetic layer 3 to the perpendicular magnetization.

As a result, only the area in a vicinity of the center of the light spot having a diameter smaller than the diameter of the light beam can be set higher than the temperature at which a transition occurs in the first magnetic layer 3 to the perpendicular magnetization. Therefore, only the described small portion has the perpendicular magnetization and shows the polar Kerr effect, while in the surrounding portion having low temperature, a transition does not occur, and thus the polar Kerr effect is not shown.

Namely, only the portion having a smaller diameter than the spot of the light beam can be made subject to reproduction. As a result, comparing with the conventional method, a reproduction of a smaller recording bit is enabled, thereby achieving a significant improvement in recording density.

Examples of the results of measurement are shown below.

First, a recording operation was performed under the following conditions:

initialization magnetic field $H_{init}$=1.0 k (Oe)

recording magnetic field $H_w$=200 (Oe)

laser power of high level I ($P_H$)=10 mW laser power of low level II ($P_L$)=4 mW recording bit length=0.8 μm.

As a result, an overwriting operation by the light intensity modulation without having remaining information after erasing could be achieved. Then, the recorded information was reproduced using a laser power $P_R$ of the reproducing level III=1 mW, and the signal to noise ratio (C/N)=47 dB was obtained.

The reproducing operation is performed with the recording bit length of 0.65 μm, and a significant drop in the C/N was not shown. This is because the first magnetic layer 3 does not have perpendicular magnetization at room temperature, and with an application of a laser beam having the laser power of the reproducing level III, only the central portion of the spot of the light beam has the perpendicular magnetization as described earlier. Therefore, the short recording bit can be reproduced without being affected by the adjoining recording bits.

As described, in the present invention, the magnetization in the first magnetic layer 3 at room temperature is arranged in an intermediate direction between the perpendicular direction and the in-plane direction and is arranged in a perpendicular direction at above a predetermined temperature. Furthermore, the saturation magnetic field wherein the perpendicular component of the magnetization is saturated at room temperature is larger than the coercive force of the second magnetic layer 4. Therefore, after initializing the second magnetic layer 4 by the magnetic field which is larger than the coercive force of the second magnetic layer 4 and smaller than the saturation magnetic field, the intensity modulated laser beam is projected so as to enable an overwriting of information by the light intensity modulation. Therefore, the required initialization magnetic field can be made smaller, thereby permitting a reduction in the size of the magneto-optical recording apparatus. Furthermore, compared with the conventional method, i.e., after erasing the recording information on the recording layer by a large external magnetic field, new information is recorded, information can be rewritten at higher speed, thereby permitting a high speed overwriting.

Furthermore, by setting the laser power of the reproducing light beam according to the temperature at which a transition occurs in the first magnetic layer 3 to the perpendicular magnetization, interference of signals from the adjoining bits, which causes noise can be prevented, thereby achieving an improved reproducing resolution. As a result, comparing with the conventional method, a reproduction of a smaller recording bit is enabled, thereby achieving a significant improvement in recording density.

As a note, the present invention is not limited to the described preferred embodiment, and various modifications are permitted within the scope of the present invention. For example, in the present embodiment, explanations have been given through the case where the Curie temperature of the first magnetic layer 3 is lower than the Curie temperature of the second magnetic layer 4. However, it may be also arranged such that the Curie temperature of the first magnetic layer 3 is higher than the Curie temperature of the second magnetic layer 4, and the first magnetic layer 3 has the in-plane magnetization at temperature above the Curie temperature of the second magnetic layer 4. This arrangement also offers the effect of high speed overwriting. The described arrangement where the Curie temperature of the first magnetic layer 3 is high offers a large Kerr rotation angle in reproducing, thereby achieving an improved property of the reproducing signal.

The composition and the material of GdFeCo used in the first magnetic layer 3 and GdDyFeCo used in the second magnetic layer 4 are not limited to those shown in the described preferred embodiment. For example, as materials for the magnetic layers 3 and 4, an alloy in which a rare-earth metal of at least one element selected from the group consisting of Gd, Tb, Dy, Ho and Nd and a transition metal of at least one element selected from the group consisting of Fe and Co are combined may be used, and the same effect can be achieved.

Furthermore, by adding at least one element selected from the group consisting of Cr, V, Nb, Mn, Be, Ni, Ti, Pt, Rh and Cu, the respective environmental resistances of the first and second magnetic layers 3 and 4 can be improved. Namely, the deterioration of the property of the first and second magnetic layers 3 and 4 due to the oxidation of the material by the moisture and oxygen being entered can be prevented, thereby ensuring a reliable performance of the magneto-optical disk for a long period of time.

The respective film thicknesses of the first and second magnetic layers 3 and 4 are determined by the materials used therein and the compositions thereof. Specifically, it is preferable that the first magnetic layer 3 has a thickness of not less than 20 nm, more preferably not less than 30 nm. However, when the first magnetic layer 3 is too thick, information recorded on the second magnetic layer 4 may not be copied thereto. Therefore, it is preferable that the first magnetic layer 3 has a thickness of not more than 100 nm. It is preferable that the second magnetic layer 4 has a thickness of not less than 20 nm, more preferably has a thickness in a range of 30 nm and 100 nm. However, if the second magnetic layer 4 is too thick, the recording sensitivity would be lowered. Therefore, it is preferable that the second magnetic layer 4 has a thickness of not more than 200 nm.

In the described preferred embodiment, a generally used glass plate is employed as the substrate 1. Other than the glass employed in the described embodiment, chemically tempered glass may be used. Alternatively, a 2P layered glass substrate in which an ultraviolet ray hardening resin film is formed on the glass or chemically tempered glass substrate, polycarbonate (PC), polymethyl methacrylate (PMMA), amorphous polyolefin (APO), polystyrene (PS), polybiphenyl chloride (PVC), epoxy, etc., may be used as the substrate 1.

The AlN film (transparent dielectric layer 2) with a thickness of 80 nm is employed in the described preferred embodiment. However, the thickness of the AlN is not limited to 80 nm. The thickness of the transparent dielectric layer 2 is determined considering a so-called Kerr effect enhancement which increases a polar Kerr rotation angle from the first magnetic layer 3 or the second magnetic layer 4 utilizing the interference effect of light in reproducing from the magneto-optical disk. In order to achieve the highest possible quality (C/N) of the reproducing signal, the polar Kerr rotation angle should be set as large as possible. For this reason, the thickness of the dielectric layer 2 is set so as to have the largest possible polar Kerr rotation angle.

The polar Kerr rotation angle changes depending on the wavelength of the reproducing light and the refractive index of the dielectric layer 2. In the described embodiment, the AlN is used as a material for the dielectric layer 2, which has the refractive index of 2.0. Therefore, for example, in the case of adopting the reproducing light with a wavelength of 780 nm, with the use of AlN with a thickness of 30–120 nm for the dielectric layer 2, a larger Kerr effect enhancement can be achieved. It is more preferable that AlN with a thickness of 70–100 nm is used for the transparent dielectric layer 2 because the Kerr rotation angle is almost maximized in this range of the film thickness.

However, the wavelength of the reproducing light is not limited to the above wave length. For example, when a reproducing light with a wavelength of 400 nm which is substantially ½ of the above wavelength of 780 nm is used, the thickness of the transparent dielectric layer 2 is also set to ½ of the above-mentioned case wavelength of 780 nm is used.

Additionally, the refractive index of the transparent dielectric layer 2 may be changed depending on a material used therein, or the employed method of manufacturing the transparent dielectric layer 2. In such a case, the thickness of the transparent dielectric layer 2 is adjusted so as to set: refractive index×film thickness=constant (optical path length).

Additionally, the larger refractive index of the transparent dielectric layer 2 offers the use of the thinner the transparent dielectric layer 2, and the greater enhance effect of the polar Kerr rotation angle.

The refractive index of AlN can be changed by changing the ratio of Ar to $N_2$ (sputtering gas used in sputtering), the gas pressure, etc. In general, AlN has relatively large refractive index of approximately 1.8–2.1, and thus it is a suitable material for the dielectric layer 2.

Not only for the enhancement of the Kerr effect, the transparent dielectric layer 2 also has the same function as the protective layer 5, i.e., preventing the oxidization of rare earth-transition metal alloys used in the first and second magnetic layers 3 and 4.

The magnetic layers made of rare earth-transition metal alloys are easily oxidized, and especially, the rear earth metal alloy is very likely to oxidize. Therefore, entering of oxygen and moisture from outside must be prevented in order to prevent the deterioration of the properties of these layers.

Therefore, in the described preferred embodiment, the magnetic layers 3 and 4 are sandwiched by the AlN films. Since the AlN films are nitride films which do not include oxygen, their moisture resistances are high. Additionally, using the Al target, a reactive DC (direct current) sputtering method may be adopted by introducing Ns gas or mixed gas of Ar and $N_2$. In this sputtering method, a higher film formation speed can be achieved compared with the RF (radio frequency) sputtering method.

Other than AlN, suitable materials for the transparent dielectric layer 2 includes: SiN, AlSiN, AlTaN, SiAlON, TiN, TiON, BN, ZnS, $TiO_2$, $BaTiO_3$, $SrTiO_3$. Among the above-listed materials, especially the use of SiN, AlSiN, AlTaN, TiN, BN or ZnS offers a magneto-optical disk having an excellent moisture resistance as there materials do not include oxygen.

The AlN film (protective layer 5) having a thickness of 80 nm is used in the described embodiment. However, the thickness of the AlN is not limited to this thickness. It is preferable that the thickness of the protective layer 5 is in a range of 1–200 nm.

Additionally, the total thickness of the first and second magnetic layers 3 and 4 is not less than 100 nm. With this thickness, light incident thereon from the optical pickup is hardly transmitted through these magnetic layers. Therefore, there is no limit for the film thickness of the protective layer 5 as long as the oxidization of the magnetic layers can be prevented for a long period of time. Thus, in the case of adopting a material of a low oxidization resistance, a thicker protective layer 5 should be used, while in the case of adopting a material of a high oxidization resistance, a thinner protective layer 5 should be used.

The thermal conductivity of the protective layer 5 as well as that of the dielectric layer 2 affects the recording sensitivity of the magneto-optical disk. Specifically, the recording sensitivity represents the laser power required in recording and erasing. The light incident on the magneto-optical disk is mainly transmitted through the dielectric layer 2. Then, it is absorbed by the first and second magnetic layers 3 and 4 which are the absorbing films, and changes into heat. Here, the heat generated from the first and second magnetic layers 3 and 4 is transferred the transparent dielectric layer 2 and the protective layer 5 by the thermal conduction. Therefore, the respective thermal conductivities and the thermal capacities (specific heat) of the dielectric layer 2 and the protective layer 5 affect the recording sensitivity.

This means that the recording sensitivity of the magneto-optical disk can be controlled to some extent by adjusting the film thickness of the protective layer 5. For example, in order to achieve a higher recording sensitivity (permitting recording and erasing with a laser beam of smaller laser power), a thinner protective layer 5 should be employed. Normally, in order to extend the life of the laser, it is preferable to have relatively high recording sensitivity, and thus the thinner protective layer 5 is preferable.

In this sense also, AlN is a suitable material. Because of its excellent moisture resistance, the use of AlN offers a thinner protective layer 5, thereby providing a magneto-optical disk of high recording sensitivity.

In the present embodiment, AlN is used both in the protective layer 5 and the dielectric layer 2. Therefore, the magneto-optical disk of the present invention has an excellent moisture resistance. Moreover, since the same material is used for the transparent dielectric layer 2 and the protective layer 5, the productivity of the magneto-optical disk can be improved.

In consideration of the above-mentioned objective and effect, other than AlN, the following materials which can be used also as materials for the transparent dielectric layer 2 are suitable for the protective layer 5: SiN, AlSiN, AlTaN, SiAlON, TiN, TiON, BN, ZnS, $TiO_2$, $BaTiO_3$ and $SrTiO_3$. Among the above-listed materials, especially, the use of SiN, AlSiN, AlTaN, TiN, BN or ZnS offers a magneto-optical disk of an excellent moisture resistance as these materials do not include oxygen.

The magneto-optical disk employed in the described embodiment is of a so called single sided type. When a thin film composed of the dielectric layer 2, the first and second magnetic layers 3 and 4 and the protective layer 5 is considered as a recording medium layer, the magneto-optical disk of the single sided type is composed of the substrate 1, the recording medium layer and the overcoat film 6. On the other hand, the magneto-optical disk of a both-sided type has a pair of the substrates 1 whereon recording medium layers are respectively laminated by an adhesive layer so that respective recording medium layers confront one another.

As to the material for the adhesive layer, especially, a polyurethane acrylate adhesive is preferable. The adhesive layer has a combined hardening property of ultraviolet ray, heat and anaerobic types. Therefore, this adhesive layer has an advantage that the shadow portion of the recording medium layer through which the ultraviolet ray is not transmitted can be hardened by heat and anaerobic. Moreover, because of its high moisture resistance, a reliable performance of the magneto-optical disk of the double-sided type can be ensured for a long period of time.

On the other hand, the magneto-optical disk of the single-sided type is suitable for a compact magneto-optical recording and reproducing apparatus because the required thickness is ½ of that required in the both-sided magneto-optical disk. On the other hand, since the magneto-optical disk of the both-sided type permits the reproduction from both sides, it is suitable for a recording and reproducing apparatus of a large capacity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:

a transparent substrate;

a first magnetic layer being laminated on the transparent substrate, said first magnetic layer exhibiting a magnetization at room temperature in an intermediate direction between a perpendicular direction and an in-plane direction;

wherein said first magnetic layer further exhibiting perpendicular magnetization when said first magnetic layer is at a temperature at above a predetermined temperature that is above room temperature;

a second magnetic layer being laminated on said first magnetic layer, said second magnetic layer exhibiting perpendicular magnetization in a temperature range between room temperature and the Curie temperature of the second magnetic layer;

wherein the coercive force of said second magnetic layer is larger than the coercive force of the first magnetic layer, when both are respectively at room temperature;

wherein the coercive force of said second magnetic layer at room temperature is less than the field strength of an initializing magnetic field;

wherein the coercive force of the second magnetic layer at room temperature is smaller than the field strength for a magnetic field, a saturated magnetic field, at which the perpendicular component of the magnetization in the first magnetic layer is saturated; and wherein the field strength of the initializing magnetic field is smaller than the saturated magnetic field for said first magnetic layer perpendicular component.

2. The magneto-optical recording medium as set forth in claim 1, wherein said first magnetic layer is composed such that the coercive force of said magnetic layer is smaller than field strength of the saturated magnetic field for first magnetic layer perpendicular component.

3. The magneto-optical recording medium as set forth in claim 1, wherein:

said first magnetic layer has a characteristic such that the perpendicular component of the coercive force at room temperature is nearly zero.

4. The magneto-optical recording medium as set forth in claim 1, wherein:

said first magnetic layer and said second magnetic layer are respectively made of rare earth metal-transition metal alloys in which the sub-lattice magnetization of the rare earth metal is greater than the sub-lattice magnetization of the transition metal.

5. The magneto-optical recording medium as set forth in claim 4, wherein:

said rare earth-transition metal alloys include at least one element selected from the group consisting of Cr, V, Nb, Mn, Be, Ni, Ti, Pt, Rh and Cu.

6. The magneto-optical recording medium as set forth in claim 1, wherein:

said first magnetic layer has a thickness in a range between 20 nm and 100 nm, and said second magnetic layer has a thickness in a range between 20 nm and 200 nm.

7. The magneto-optical recording medium as set forth in claim 1, further comprising:

a dielectric layer formed on a side of said first magnetic layer, and a protective layer formed on a side of said second magnetic layer so as to sandwich said first magnetic layer and said second magnetic layer between said dielectric layer and said protective layer.

8. The magneto-optical recording medium as set forth in claim 7, wherein:

said protective layer and said dielectric layer are made of the same material.

9. The magneto-optical recording medium as set forth in claim 8, wherein:

the material does not include oxygen in its components.

10. The magneto-optical recording medium as set forth in claim 1, further comprising:

a third magnetic layer and a fourth magnetic layer having the same characteristics as said first magnetic layer and said second magnetic layer, respectively, said third magnetic layer and said fourth magnetic layer being formed on an opposite side of said substrate from said first magnetic layer and said second magnetic layer.

* * * * *